(12) United States Patent
Wolff et al.

(10) Patent No.: US 7,103,973 B2
(45) Date of Patent: Sep. 12, 2006

(54) METHOD, DEVICE, AND TOOL FOR CHAMFERING THE FRONT-END EDGES OF THE INTER-TEETH GROOVES OF A GEAR

(75) Inventors: Alfred Wolff, Buchen (DE); Siegfried Thiesies, Schwarzenbek (DE); Wolfgang Carmincke, Lentenau (DE)

(73) Assignee: Fette GmbH, Schwarzenbek (DE)

( * ) Notice: Subject to any disclaimer, the term of this patent is extended or adjusted under 35 U.S.C. 154(b) by 119 days.

(21) Appl. No.: 10/874,653

(22) Filed: Jun. 22, 2004

(65) Prior Publication Data

US 2005/0000072 A1    Jan. 6, 2005

(30) Foreign Application Priority Data

Jul. 5, 2003    (DE)    ................. 103 30 474

(51) Int. Cl.
B23P 23/00 (2006.01)
B23F 19/10 (2006.01)
B23F 21/16 (2006.01)

(52) U.S. Cl. .................. 29/893.35; 29/566; 29/56.5; 409/8; 409/12; 409/31; 409/40; 409/51; 409/55

(58) Field of Classification Search ............... 409/8–9, 409/12, 31, 33, 37, 38–40, 51, 55; 29/558, 29/56.5, 566, 893, 893.3, 893.35, 893.36
See application file for complete search history.

(56) References Cited

U.S. PATENT DOCUMENTS

| | | | | |
|---|---|---|---|---|
| 1,578,589 A | * | 3/1926 | Schuyler | 409/8 |
| 2,451,447 A | * | 10/1948 | Ransome | 409/8 |
| 2,597,129 A | * | 5/1952 | Remich | 407/26 |
| 3,188,915 A | * | 6/1965 | Fritz | 409/33 |
| 3,782,041 A | * | 1/1974 | Batorski | 451/123 |
| 3,822,631 A | * | 7/1974 | Bauknecht et al. | 409/8 |
| 3,926,091 A | * | 12/1975 | Sloane | 409/8 |
| 4,961,289 A | * | 10/1990 | Sulzer | 409/11 |
| 5,379,554 A | * | 1/1995 | Thurman et al. | 451/177 |
| 6,079,090 A | * | 6/2000 | Ongaro | 409/11 |
| 6,757,949 B1 | * | 7/2004 | Fitzgerald et al. | 29/56.5 |
| 6,939,093 B1 | * | 9/2005 | Arvin et al. | 409/12 |
| 2004/0109735 A1 | * | 6/2004 | Arvin et al. | 409/12 |

FOREIGN PATENT DOCUMENTS

| | | |
|---|---|---|
| DE | 199 02 035 A1 | 7/2000 |
| DE | 10230148 A1 * | 10/2004 |
| JP | 60-71117 A * | 4/1985 |

* cited by examiner

Primary Examiner—Erica Cadugan
(74) Attorney, Agent, or Firm—Vidas, Arrett & Steinkraus, P.A.

(57) ABSTRACT

A method for the manufacture of a toothed gear from a gear blank wherein the gear blank loaded into a machine tool and rotationally driven is machined by a hobbing cutter disposed on a rotationally driven tool shaft and the rough-hobbed gear, once produced, is subsequently cleared of burr by means of a rotationally driven deburring tool by causing it to chamfer the front-end edges of the inter-teeth grooves, wherein the number of revolutions of said deburring tool and rough-machined gear has a constant ratio, wherein the removal of burr is performed on said rough-machined gear invariably loaded on said machine tool in a continuous pass by using a deburring tool which is similar to a side milling cutter, has cutting teeth, and is fixedly disposed for rotation on the shaft of said hobbing cutter, wherein the front-end edges of the inter-teeth grooves are successively machined in the way of a gear hobbing process, and wherein said shaft is changed from the gear hobbing setting over to a burr removal setting.

5 Claims, 3 Drawing Sheets

METHOD, DEVICE, AND TOOL FOR CHAMFERING THE FRONT-END EDGES OF THE INTER-TEETH GROOVES OF A GEAR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a method for the manufacture of a toothed gear device for the manufacture of a toothed gear and a tool for deburring the front-end edges of the inter-teeth grooves of a gear.

It is known to produce toothed gears by means of so-called hobbing cutters. Hobbing cutters have a worm as a geometrical body to start from. When the worm is given clamping grooves hobbed teeth are obtained which, when subjected to relieving, become then able to cut. After gear-like workpieces are hobbed the front-end edges of the inter-teeth grooves and tooth heads will have sharp edges, specifically at the side at which the hobbing tool exits. It is known to remove the burr in a manual operation. Further, it is known to remove the burr by grinding, profile milling or by means of press rolling.

DE 199 02 035 has made known a method for the removal of burr from the front-end edges of the inter-teeth grooves on gear-like workpieces in which the tool's axis of rotation is operated at a fixed radial spacing from the workpiece's axis of rotation and at a fixed axial spacing from the tool's front-end face at a constant speed ratio with respect to the workpiece which is continuously driven by rotation, a cutter plate seated on the tool axis forming cutting edges for chamfering the groove root edge at a predetermined root chamfering angle, chamfering a first groove flank edge at a predetermined flank chamfering angle, and chamfering a second groove flank edge opposed to the first one at a predetermined flank chamfering angle. At this point, chamfering is not continuous, but is discontinuous in a single-piece procedure.

All known devices have in common that they are machined on a device which is separated from the hobbing machine. Normally, the manufacturing process of a toothed gear is such that a blank is first turned on a lathe and finally is machined by a hobbing cutter on a machine tool. After hobbing, deburring is done in a separate device and is then followed by shaving as a micro-machining operation which can be performed again on the same machine tool on which the hobbing procedure is carried out.

The methods which are known exhibit considerable disadvantages. A separate deburring device will naturally increase the need for machining equipment. Expenditure in manufacture arises by the need to transfer the rough-hobbed gear to the deburring device, which requires a certain time for transport and retooling. A further drawback of the known method is that it has a relatively large cycle time.

It is the object of the invention to indicate a method for the manufacture of a toothed gear from a gear blank in which the removal of burr involves a distinctly lower expenditure in manufacture and machining equipment.

BRIEF SUMMARY OF THE INVENTION

In the inventive method, the removal of burr is performed on the rough-machined gear invariably loaded on the machine tool in a continuous pass by using a deburring tool which is similar to a side milling cutter, has cutting teeth, and is fixedly disposed for rotation on the shaft of the hobbing cutter. As is known the tool shaft is adjustable in space. After the hobbing procedure, the tool shaft is adjusted so as to allow the deburring tool, by rotating it with the shaft, to be brought into engagement with the front-end edges of the inter-teeth grooves now in order to successively machine the front-end edges of the inter-teeth grooves in the way of a hobbing process.

The inventive process has significant advantages. Although a separate deburring tool is needed to remove the burr the tool is employed on the same machine tool on which the hobbing process is carried out. This drastically reduces the need for machining equipment as compared to conventional methods. The expenditure in manufacture is considerably reduced as well. Transport times, setting times, and retooling times for the deburring process after the end of the hobbing process become largely unnecessary. This saves significant time for manufacture. Since the burr is removed continuously in the pass the cycle time for deburring a toothed gear is by far smaller than in conventional processes.

It is unnecessary either to transfer the workpiece to remove the burr from either side of the toothed gear, but the rough-machined gear may remain mounted in its position, according to an aspect of the invention, because the front-end edges are first machined on one side of the rough-machined gear and then are the front-end edges on the other side. The deburring tool is moved towards the front-end edges, in one case, and is moved away from the front-end edges from between the inter-teeth grooves, in the other case.

The inventive method also makes it possible to perform chamfering in two or more steps by advancing the deburring tool by a predetermined amount prior to each pass. This allows to choose the size of the chamfer nearly randomly.

The inventive device, specifically for implementing the inventive method, provides means for fixedly mounting a disc-shaped deburring tool having teeth for rotation next to the hobbing cutter on the tool shaft which as was mentioned previously is known to be adjustable in space along all of the three axes. According to an aspect of the invention, the deburring tool is a separate tool which is separately and fixedly disposed on said tool shaft for rotation. Alternatively, it may also be brought into a rotary engagement with the hobbing cutter, e.g. by jaws which are formed at the front ends facing each other of the hobbing cutter and deburring tool. Finally, according to another aspect of the invention, the deburring tool can also be formed integrally with the hobbing cutter.

The deburring tool for implementing the inventive method has cutting teeth and clamping grooves at an equal circumferential spacing at the circumference. The cutting teeth run helically in a circumferential direction. The cutting edges formed at the side which is the front side of the teeth in a rotational direction are disposed on a common fly circle. The deburring tool has multiple leads, at least one tooth being provided for each lead. If the deburring tool has one tooth per lead one tooth each will mesh with a tooth space of the toothed gear during the synchronized rotational motion of the deburring tool and toothed gear. If two or more teeth are provided for each lead all of the teeth will interact with a inter-teeth groove each with a certain front-end edge area of the inter-teeth groove being associable with each tooth. In other words, the teeth of a lead machine successive areas of the front-end edges.

Since the front-end edges of the tooth heads possibly require to be chamfered as well an aspect of the invention provides that cutting edges be provided next to the teeth to chamfer the front-end edges of the tooth heads of the toothed gear.

In a straight-toothed gear, the profile of the cutting edges of the cutting teeth is symmetric to the central plane of the deburring tool. On the other hand, it is asymmetric in a helically toothed gear.

The further advantage of the inventive deburring tool is that it can be resharpened on the machine tool. This admittedly causes a certain removal rate, but the profile required remains unchanged.

The inventive toothed gear equals a side milling cutter which, however, has the helically extending teeth disposed in such a way that identical points of all teeth are on the same fly circle. This is contrary to a side milling cutter as a tooth-forming tool.

BRIEF DESCRIPTION OF THE SEVERAL VIEWS OF THE DRAWINGS

The invention will be described in more detail below with reference to an embodiment shown in the drawings.

DETAILED DESCRIPTION OF THE INVENTION

Figure 1:
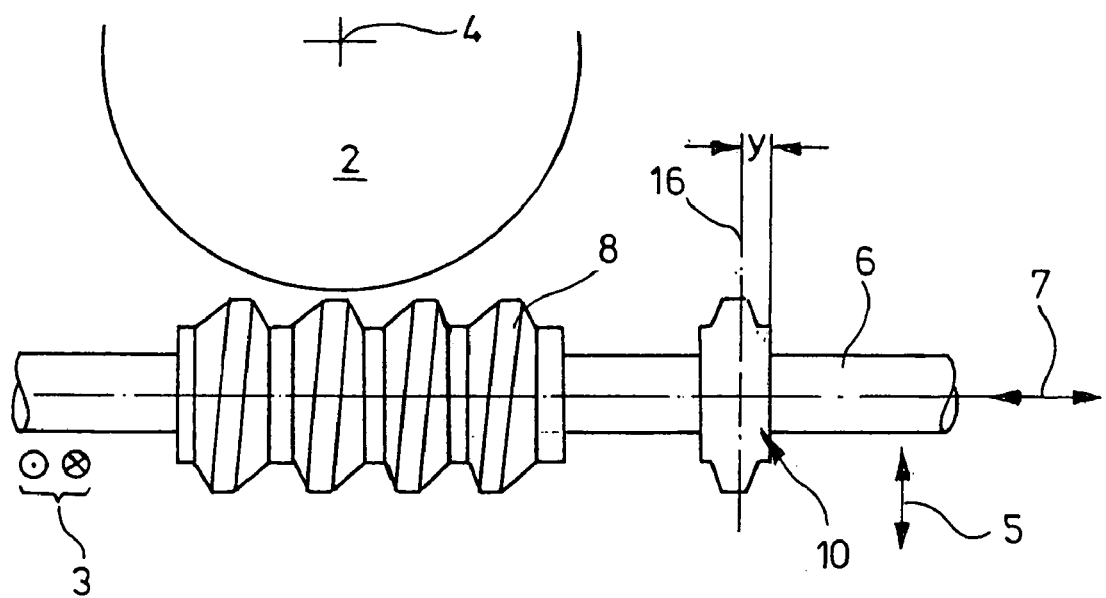
FIG. 1 extremely schematically shows a hobbing and deburring device according to the invention.

While this invention may be embodied in many different forms, there are described in detail herein a specific preferred embodiment of the invention. This description is an exemplification of the principles of the invention and is not intended to limit the invention to the particular embodiment illustrated In FIG. 1, a gear blank is outlined at 2 which is loaded on a machine tool in a manner which is not shown in detail and is rotationally driven about an axis 4. The axis is perpendicular to the plane of the drawing, for example. A shaft 6 of the machine tool has mounted thereon a hobbing cutter 8. The shaft 6 can be shifted in space as is outlined by the two-ended arrow 7, the two-ended arrow 5, and the directions shown at 3. Rotating the tool shaft 6 and providing the correct setting and the correct feed motion and advancement produces a spur gear. This process is generally known and is not thought to be discussed in detail.

The shaft 6 has mounted thereon a deburring tool 10. It serves for the removal of burr from the front-end edges of the inter-teeth grooves of the toothed gear produced before, reference to which will be made in FIGS. 3 to 5 which follow below.

Figure 3:
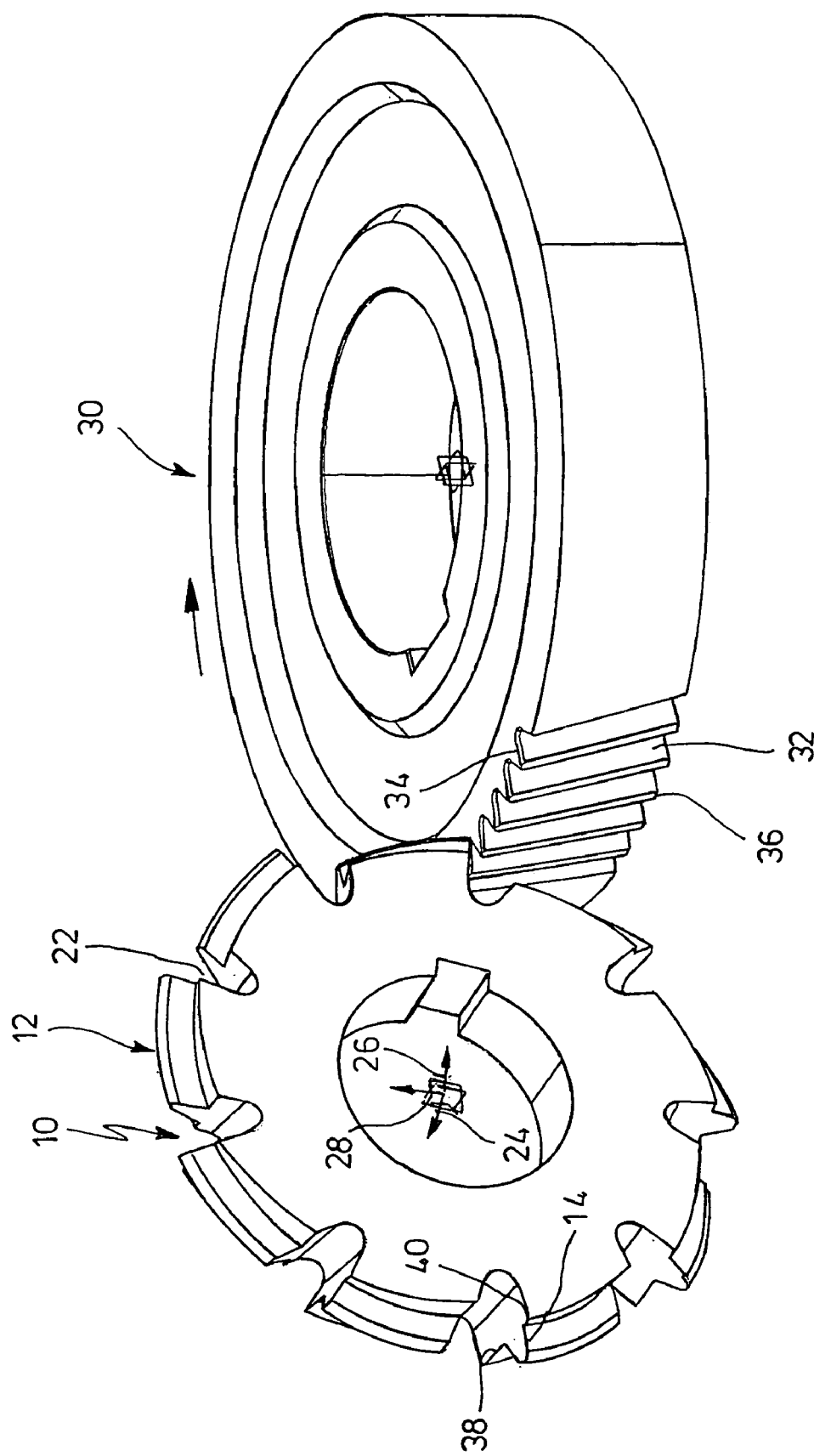
FIG. 3 shows the arrangement of a toothed gear and a deburring tool according to the invention during the deburring procedure in a perspective view.

The disc-shaped deburring tool 10 is represented in a perspective view in FIG. 3. Each tooth 12 is on a helical line. Clamping grooves 22 of a V-shaped contour and a rounded bottom are located between the teeth 12. When the deburring tool 10 rotates the edges of the front-end sides of the teeth 12 define cutting edges 14 each. The peculiar feature of a deburring tool similar to a side milling cutter is that each tooth 12 is disposed on a lead of its own. Since nine teeth 12 are provided at a uniform circumferential spacing the deburring tool 10 is nine-leaded. A further peculiarity is that the cutting edges 14 or predetermined points of the teeth 12 are disposed on a common fly circle.

FIG. 3 also outlines the three axes along which the deburring tool 10 can be moved by means of the tool shaft 6 shown in FIG. 1. Along axes 26, 28, the feed motion is effected with respect to a toothed gear 30 which is provided with helical teeth 32 and in which the front-end edges of the inter-teeth grooves are shown as being chamfered or deburred already. This chamfer is outlined at 34 in FIG. 3. The toothed gear 30 of FIG. 3 rotates in a clockwise sense as does the deburring tool 10.

According to the hobbing procedure of FIG. 1, the tool shaft 6 is shifted such as to move the deburring tool 10 to a position as is depicted in FIG. 3. While the front-end edges of the inter-teeth grooves are being machined the toothed gear 30 and deburring tool 10 rotate at a predetermined speed ratio so that one tooth 12 each works on the front-end edges of an inter-teeth groove. It goes without saying that the deburring tool 10 and teeth 12 are designed in accordance with the parameters of the teeth of the toothed gear 30 to enable the desired engagement with the front-end edges of the inter-teeth grooves.

In the representation of FIG. 3, the front-end edges are initially machined on the upwardly facing side of the toothed gear 30. If it is also desired to chamfer the front-end edges on the opposed, lower side the toothed gear 30 will not be mounted as turned through 180° here, but it remains in the position which is shown. Machining it merely requires that the deburring tool 10 be moved downwards relative to the toothed gear 30 in the direction of the axis 28 so that the teeth 12, while deburring is underway, are moved outwardly as viewed from the grooves 32 (downwardly in FIG. 3) in order to produce a chamfer also at this point.

If it is intended to work out a chamfer to the tooth heads 36 it can be done by means of cutting edges 38 and 40 which are disposed on the two sides of the cutting edge 14.

Figure 4:
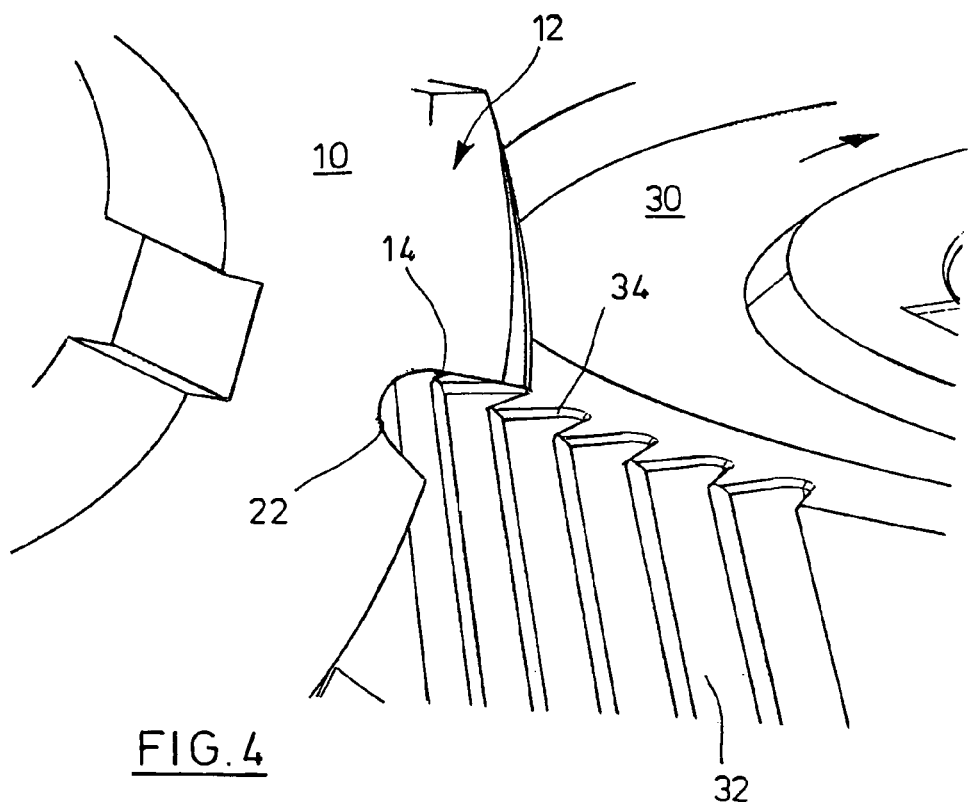
FIG. 4 shows some part of the view of FIG. 3 in a enlarged perspective view.
Figure 5:
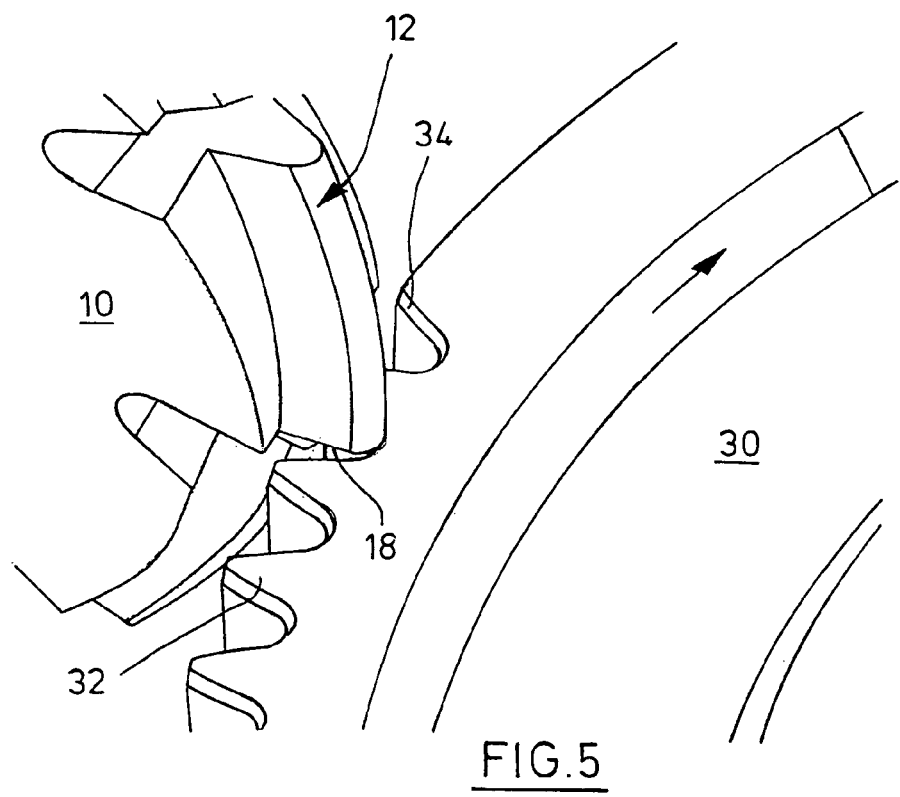
FIG. 5 also shows some part of FIG. 3, but as viewed obliquely from top.

It is perceivable to provide two or more teeth per lead unlike the way shown in FIGS. 3 to 5. While machining is done all of the teeth of a lead will come into successive engagement with the front-end edge of a inter-teeth groove.

Figure 2:
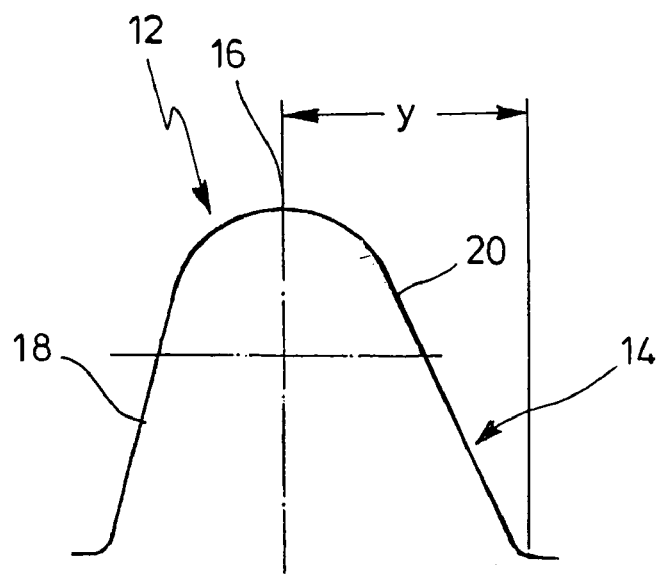
FIG. 2 shows the reference profile in a normal section of a cutting tooth of a deburring tool of FIG. 1.

FIG. 2 shows the reference profile of a tooth 12 in a normal section. It can be recognized that the profile is not symmetric with respect to the axis 16 which passes through the central plane, but presents a steeper flank 18 and a less ascending flank 20. Nor is the apex area symmetric. The steeper flank 18 includes a smaller radius than does the less ascending flank 20. A profile of this type is needed for a helically toothed gear. On the other hand, a symmetric profile may be employed if a burr-toothed gear requires deburring.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the manufacture of a toothed gear from a gear blank wherein the gear blank is loaded into a machine tool and rotationally driven and is machined by a hobbing cutter disposed on a rotationally driven tool shaft, and the rough-hobbed gear, once produced, is subsequently cleared of burr by means of a rotationally driven deburring tool by causing said deburring tool to chamfer front-end edges of inter-teeth grooves, wherein the number of revolutions of said deburring tool and rough-hobbed gear has a constant ratio, characterized in that the removal of burr is performed on said rough-hobbed gear invariably loaded on said machine tool in a continuous pass by using said deburring tool, which deburring tool is similar to a side milling cutter, has cutting teeth having cutting edges that are each asymmetric relative to a central plane of the deburring tool, and is fixedly disposed for rotation on the shaft of said hobbing cutter, wherein the front-end edges of the inter-teeth grooves are successively machined in the way of a gear hobbing process, and wherein said shaft is changed from the gear hobbing setting over to a burr removal setting to perform said burr removal.

2. The method of claim 1, characterized in that the removal of burr from said front-end edges is performed on one side of said rough-hobbed gear by advancing said deburring tool against this side of said rough-hobbed gear and the removal of burr from said front-end edges of said inter-teeth grooves on the opposite side of said rough-hobbed gear is performed in a second burr removal setting by advancing said deburring tool outwardly from said inter-teeth grooves away from the other side.

3. The method according to claim 1, characterized in that chamfering is performed in two or more passes, said deburring tool being advanced by a predetermined amount prior to each pass.

4. The method according to claim 1, wherein the deburring tool has clamping grooves (22) and the cutting teeth (12) in a helical peripheral run at equal circumferential spacings at the circumference of the deburring tool which are disposed in multiple leads having at least one tooth (12) per lead, the cutting edges (14) formed at the front side of the teeth (12) in a rotational direction being disposed on a common fly circle.

5. The method according to claim 4, characterized in that at least one more cutting edge (14) is provided next to the cutting edges (14) of the teeth (12) to chamfer the front-end edges of the tooth heads of the toothed gear (30).

* * * * *